US005477680A

United States Patent [19]

Heskey et al.

[11] Patent Number: 5,477,680

[45] Date of Patent: Dec. 26, 1995

[54] MOTOR DRIVEN HYDRAULIC TOOL WITH VARIABLE DISPLACEMENT HYDRAULIC PUMP

[75] Inventors: George T. Heskey, Derry, N.H.; Louis-Claude Porel, Jean Menil; William Michel, Azerailles, both of France

[73] Assignees: Burndy Corporation, Norwalk, Conn.; Hydro Rene Leduc, Azerailles, France

[21] Appl. No.: 305,144

[22] Filed: Sep. 13, 1994

[51] Int. Cl.[6] ............................ F16D 31/02; B23Q 5/00; F04B 1/06

[52] U.S. Cl. ............................ 60/452; 417/219; 173/148

[58] Field of Search ............................ 60/452; 91/497; 417/219, 273, 221; 173/148

[56] References Cited

U.S. PATENT DOCUMENTS

| | | | |
|---|---|---|---|
| 2,376,016 | 5/1945 | Schnell | 417/219 |
| 2,896,410 | 7/1959 | Schmidt | 173/148 |
| 3,028,814 | 4/1962 | Rumsey et al. | 417/219 X |
| 3,528,510 | 9/1970 | Peterson | 173/148 |
| 3,995,570 | 12/1976 | Wanner | 173/105 |
| 4,094,365 | 6/1978 | Wanner | 92/144 X |
| 4,299,294 | 11/1981 | Womack | 173/148 |
| 4,310,198 | 1/1982 | Destree | 299/39 |
| 4,594,056 | 6/1986 | Brunner | 417/273 X |
| 4,601,641 | 7/1986 | Kuroyanagi et al. | 417/219 |
| 4,721,029 | 1/1988 | Hoffman et al. | 91/520 |
| 5,125,324 | 6/1992 | Araki et al. | 91/454 |
| 5,243,761 | 9/1993 | Sullivan et al. | 60/407 X |

FOREIGN PATENT DOCUMENTS

| | | | |
|---|---|---|---|
| 0238718 | 9/1987 | European Pat. Off. . | |
| 2644383 | 9/1990 | France . | |
| 2944011 | 2/1981 | Germany . | |
| 3719442 | 12/1988 | Germany . | |
| 61-31675 | 2/1986 | Japan | 417/221 |
| 791720 | 3/1958 | United Kingdom . | |

*Primary Examiner*—John E. Ryznic
*Attorney, Agent, or Firm*—Perman & Green

[57] ABSTRACT

A hydraulic drive system for a battery operated portable compression tool. The tool has an electric motor. The drive system has a self-regulating variable displacement pump with a rotatable conduit frame having radial conduits, pistons reciprocally located in the conduits, and a ring bearing surrounding the conduit frame in an eccentric adjustable location. Ends of the pistons are located against the inside of the ring bearing. A valve plate located against a front end of the rotatable conduit frame to control entry and exit of fluid into and out of the conduit frame as it is rotated.

18 Claims, 4 Drawing Sheets

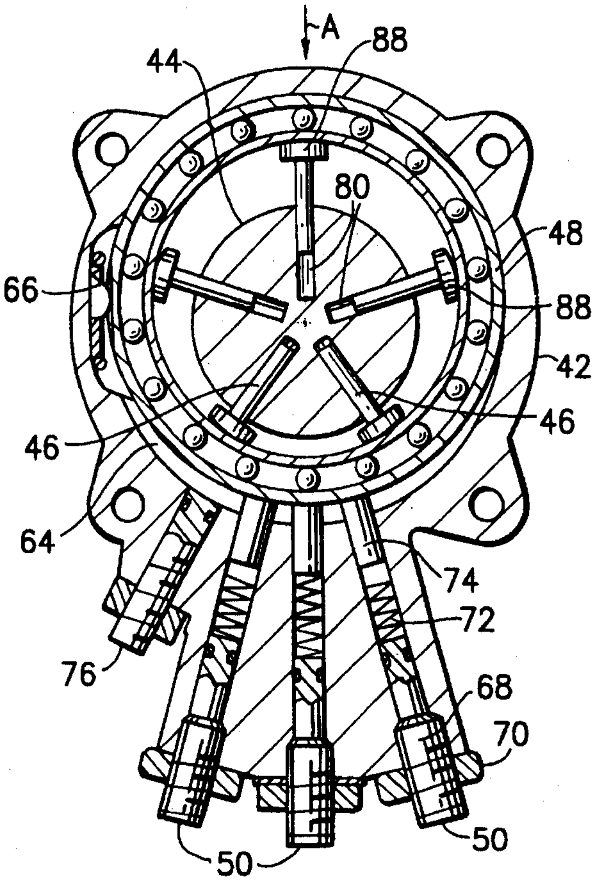
FIG. 3A
FIG. 3B
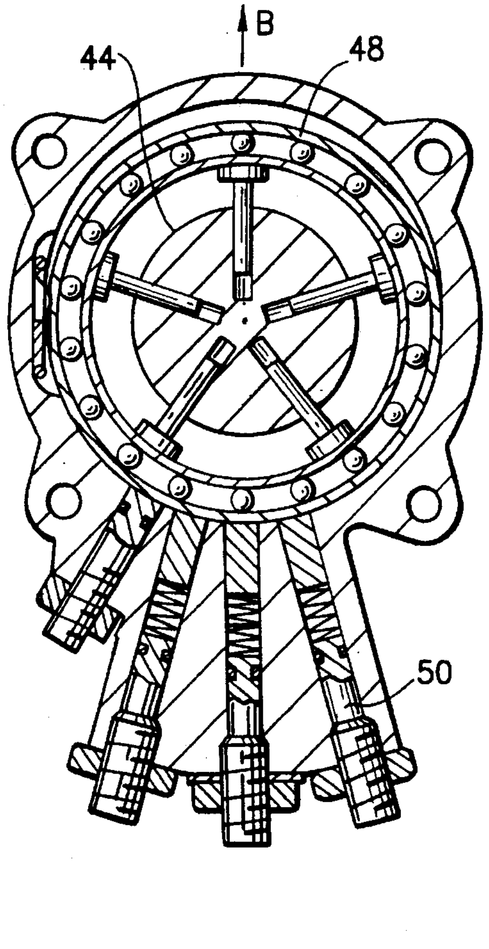

MOTOR DRIVEN HYDRAULIC TOOL WITH VARIABLE DISPLACEMENT HYDRAULIC PUMP

BACKGROUND OF THE INVENTION

1. Field of the Invention

The present invention relates to hydraulically driven tools and, more particularly, to a motor driven hydraulic tool with a self-regulating variable displacement pump.

2. Prior Art

U.S. Pat. Nos. 5,195,354; 5,111,681; and 5,272,811 disclose motor driven hydraulic tools. U.S. Pat. Nos. 4,956,992; 4,932,237; and 4,774,762 disclose battery operated crimpers. U.S. Pat. Nos. 4,475,374; 4,084,460; 2,343,595; 2,180,979; and 2,158,855 disclose other types of relevant compression tools. U.S. Pat. Nos. 5,113,679; 5,152,162; and 5,195,042 disclose a hydraulic compression tool with an electronic controller, batteries, signal lights, a hydraulic system pressure sensor, and a system for deactivating pumping effect of a pump when a predetermined hydraulic system pressure is reached. The tool has a two stage pump that decreases the volume of fluid pumped by the pump when hydraulic system pressure reaches a predetermined level. Huskie Tools Inc. of Glendale Heights, Ill. sells a portable, hand-held automatic cable crimper sold under the trademark ROBO*CRIMP that uses replaceable, rechargeable battery cartridges. An LED battery power level indicator flashes when five compression cycles remain.

SUMMARY OF THE INVENTION

In accordance with one embodiment of the present invention in a portable compression tool having a working head, an electric motor, and a hydraulic drive system operably connecting the electric motor to the working head, the improvement comprises the hydraulic drive system having a self regulating variable displacement pump with means for allowing the electric motor to operate at a substantially constant speed regardless of an increase in hydraulic pressure in the hydraulic drive system.

In accordance with another embodiment of the present invention, in a hydraulic tool having a working head, an electric motor, and a hydraulic drive system, the improvement comprises the hydraulic drive system having a pump with a rotatable conduit frame directly connected to a drive shaft of the electric motor. A plurality of piston members are movably located in radial conduits of the conduit frame. The piston members are rotated with the conduit frame and are reciprocally moved in the radial conduits as the conduit frame is rotated to thereby pump hydraulic fluid through the conduit frame.

In accordance with another embodiment of the present invention, in a portable compression tool having a working head, an electric motor, a battery, and a hydraulic drive system, the improvement comprises the hydraulic drive system having a rotatable piston ring, a plurality of piston members located adjacent to an interior side of the piston ring and projecting towards each other, and a rotatable conduit frame connected to the motor and located inside the piston ring. The conduit frame has a plurality of inwardly extending radial piston conduits. The piston ring and the conduit frame are located in parallel non-concentric axes of rotation such that rotation of the conduit frame causes the pistons to reciprocally move in the piston conduits.

BRIEF DESCRIPTION OF THE DRAWINGS

The foregoing aspects and other features of the invention are explained in the following description, taken in connection with the accompanying drawings, wherein:

FIG. 3A is a cross-sectional view of the drive system shown in FIG. 2 taken along line 3A—3A;

FIG. 3B is a cross-sectional view as in FIG. 3A with the ring bearing of the pump at a different position;

DETAILED DESCRIPTION OF THE PREFERRED EMBODIMENT

Figure 1:
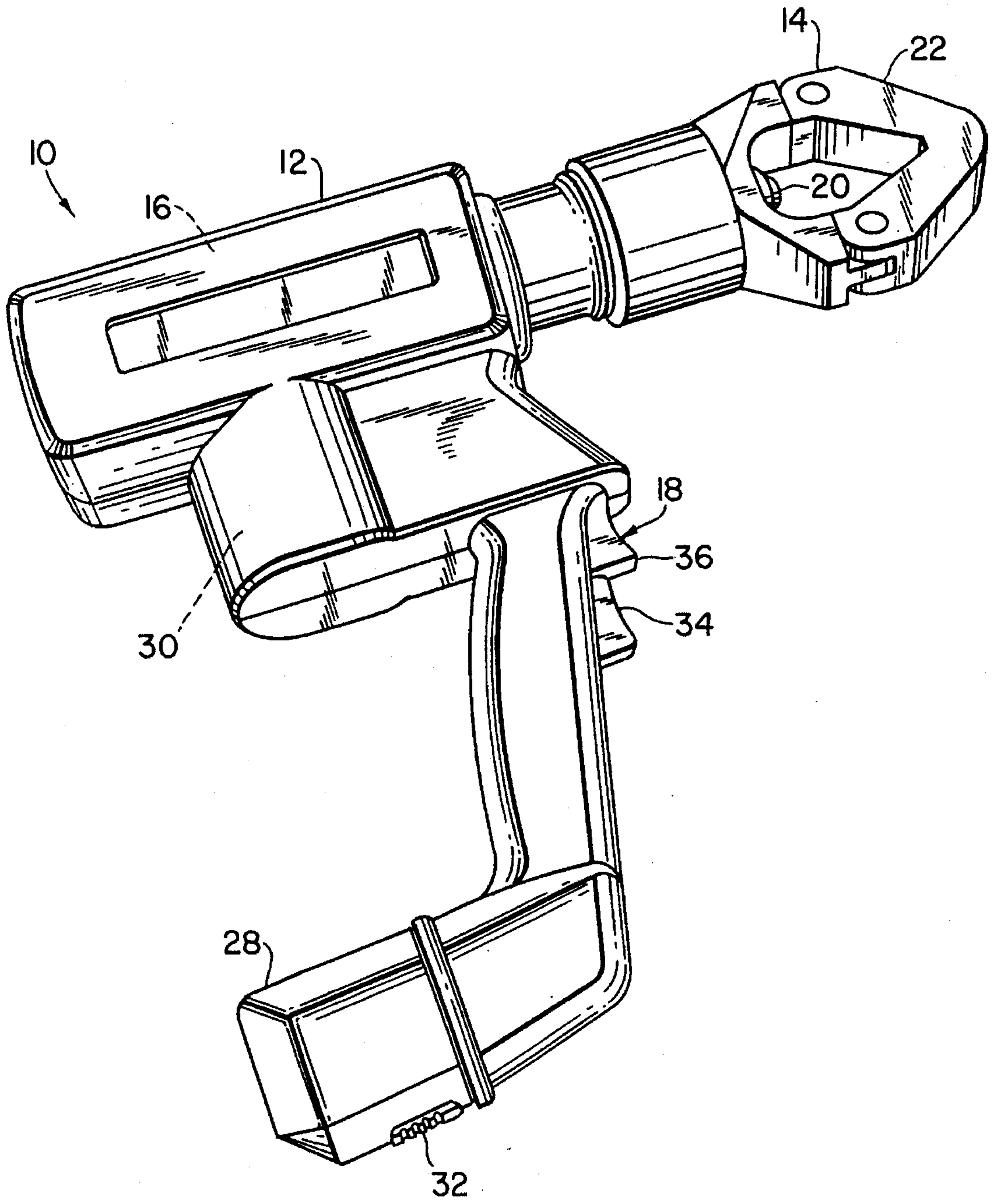
FIG. 1 is a perspective view of a portable compression tool comprising features of the present invention.

Referring to FIG. 1, there is shown a perspective view of a portable compression tool 10 incorporating features of the present invention. Although the present invention will be described with reference to the single embodiment shown in the drawings, it should be understood that features of the present invention may be embodied in various different forms and types of alternate embodiments or tools. In addition, any suitable size, shape or type of elements or materials could be used.

Figure 2:
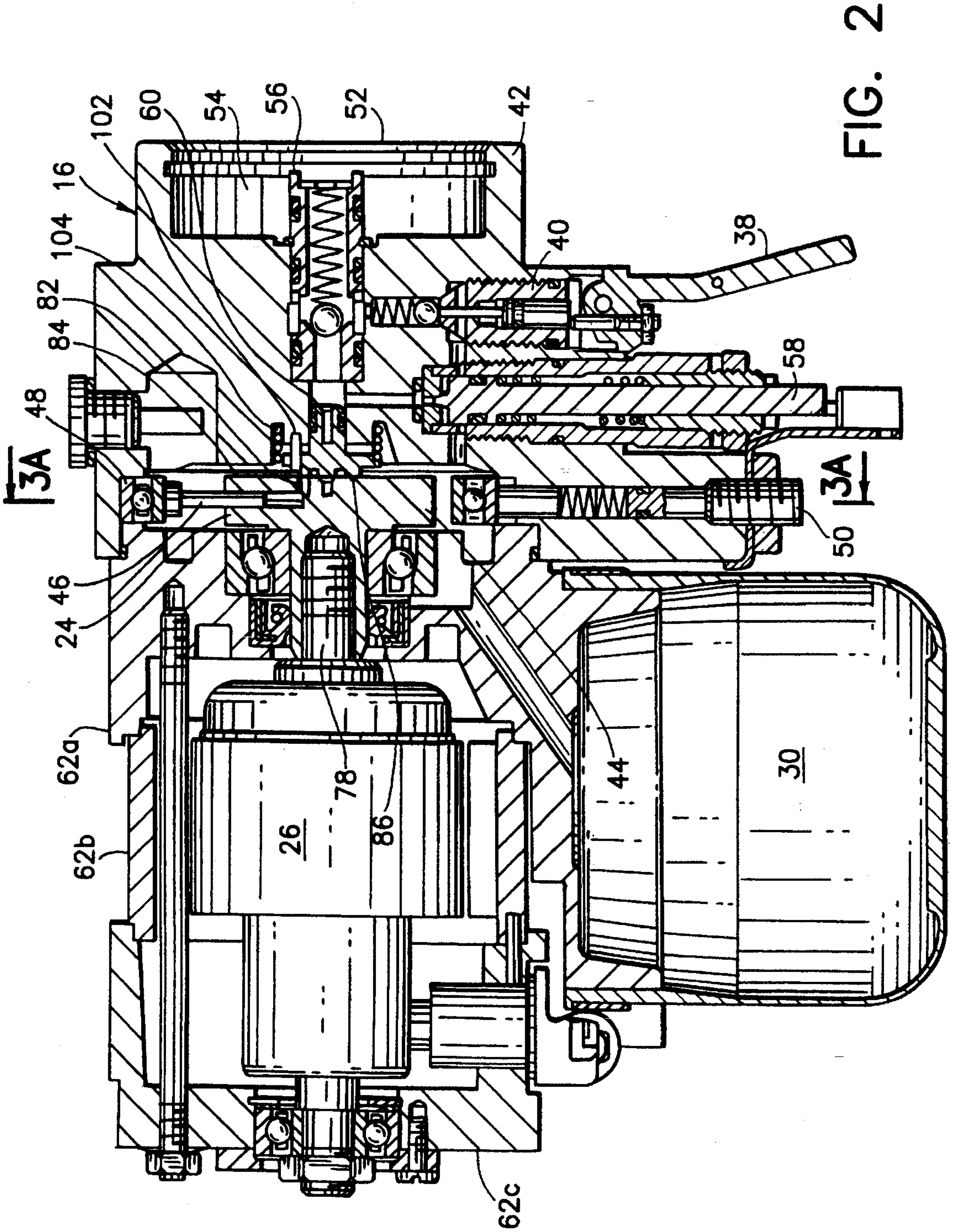
FIG. 2 is a cross-sectional view of the hydraulic drive system of the tool shown in FIG. 1.

Referring also to FIG. 2, the tool 10 generally comprises a housing 12, a compression head 14, a drive system 16, and a control system 18. The compression head 14 is a well known part of crimping tools and includes a spring loaded ram 20 and a frame 22. The frame 22 forms an anvil section for the ram 20. However, any suitable compression head could be provided. Removable crimping dies could also be provided.

The drive system 16 generally comprises a hydraulic pressure system with a pump 24, an electric motor 26, and a battery 28. The use of a hydraulic pressure system to move a ram is generally known in the art as seen in U.S. Pat. No. 5,113,679 which is hereby incorporated by reference in its entirety. Instead of the manually actuated tool disclosed in U.S. Pat. No. 5,113,679, the tool 10 uses the motor driven pump 24. In a preferred embodiment, the pump 24 is a radial piston, self-regulating variable capacity, direct drive micro-hydraulic pump. However, other types of pumps could be used. The hydraulic system includes a pressurized hydraulic reservoir 30 for supplying hydraulic fluid to the pump 24. The reservoir 30 also receives hydraulic fluid from the compression head 14 when the ram 20 is being retracted. In the embodiment shown, the electric motor 26 is a high performance rare earth element permanent magnet motor manufactured by G.E.C.-Alsthom. However, in alternate embodiments, other types of motors could be used. The motor 26 is directly connected to the pump 24 without a gear transmission. The battery 28, in the embodiment shown, is a 12 volt removable rechargeable Nickel-Cadmium battery made from ten sub-C cells yielding 1.7 amp-hours of charge. However, in alternate embodiments, other types of batteries or power sources could be used. The battery 28 has a latch 32 for snap latching and removing the battery from connection with the housing 12. Located inside the housing 12 is a battery terminal (not shown) for making electrical connection with the connected battery 28.

The control system 18 is generally described in U.S. patent application Ser. No. 08/224,825 filed on Apr. 8, 1994 which is hereby incorporated by reference in its entirety. The control system 18 includes an actuation trigger 34 and a ram retraction trigger 36. The actuation trigger 34 can actuate an electrical switch (not shown). The electrical switch is located in a circuit path between the battery 28 and a printed circuit board (not shown) to control actuation of the electric motor 26. The ram retraction trigger 36 is connected to the lever 38 of the release valve 40. In alternate embodiments, other types of control systems could be used.

The drive system 16 will now be described in detail. The pump 24 generally comprises a valve frame 42, a rotatable conduit frame 44, a plurality of piston members 46, a ring bearing 48, and adjusting locators 50. The valve frame 42 has a front end 52 with an aperture 54 that the compression head 14 is connected in. A main check valve 56, the release valve 40, a relief valve 58, a valving or valve plate 60, the adjusting locators 50, and ring bearing 48 are connected to the valve frame 42. Connected to the rear end of the valve frame 42 are additional frame pieces **62*a*, 62*b*, 62*c* that connect the motor 26 and the reservoir 30 to the valve frame 42. Referring also to FIG. 3A, the ring bearing 48 is located in the area 64 of the valve frame 42. The area 64 is larger than the ring bearing 48. The ring bearing 48 is adapted to move relative to the valve frame 42 in the area 64, from the home position shown in FIG. 3A as indicated by arrow A. The three adjusting locators 50 are provided to bias the ring bearing 48 in the home position shown in FIG. 3A. An additional side spring 66 is also provided to keep the ring bearing 48 properly positioned in the home position. The adjusting locators 50 each generally comprise a screw 68, a locking nut 70, a spring 72, and a plunger 74. The springs 72 bias the plungers 74 against the ring bearing 48. Thus, the locators 60 bias the ring bearing 48 in its home position. The screws 68 can be adjusted to increase or decrease the force exerted by the springs 72 on the plungers 74. This can increase or decrease the biasing force exerted by the plungers 74 on the ring bearing 48. A limit screw 76 is also provided to adjustably limit the movement of the ring bearing 48 in direction A. The limit screw 76 can stop the ring bearing 48 before it reaches the bottom of the area 64**.

The conduit frame 44 is directly fixedly connected to the drive shaft 78 of the electric motor 26. The conduit frame 44 is located in area 64. The conduit frame 44 generally comprises five radial piston conduits 80; one for each of the pistons 46. Each radial piston conduit 80 has a separate bore 82 (see FIG. 2) from the bottom of the radial conduit 80 to the front face 84 of the conduit frame 44. The front face 84 of the conduit frame 44 is located against the rear face 86 of the valve plate 60.

The piston members 46 are slidingly located in the radial piston conduits 80 for reciprocal movement relative to the conduits 80 as the conduit frame 44 is axially rotated by the electric motor 26. As seen from FIG. 3A, at the home position, the center axis of the conduit frame 44 is offset from the center axis of the ring bearing 48. The piston members 46 are all the same. In the home position shown in FIG. 3A, because of the non-concentric axes of the conduit frame 44 and ring bearing 48, the piston members 46 at the bottom are located in a deeper position in their conduits 80 than the other piston members. Because the piston members 46 are located in the conduits 80, the piston members 46 are rotated with the conduit frame 44. The piston members 46 each have an enlarged base 88. As the conduit frame 44 is rotated, centrifugal force causes the bases 88 to be retained against the inside race of the ring bearing 48. In an alternate embodiment direct mechanical means could be used to connect the bases 88 to the inner race of the ring bearing 48. Because of the parallel non-concentric axes of the conduit frame 44 and ring bearing 48, the piston members 46 are reciprocally moved inwardly and outwardly in the conduits 80 as the conduit frame 44 is axially rotated.

Figure 4A:
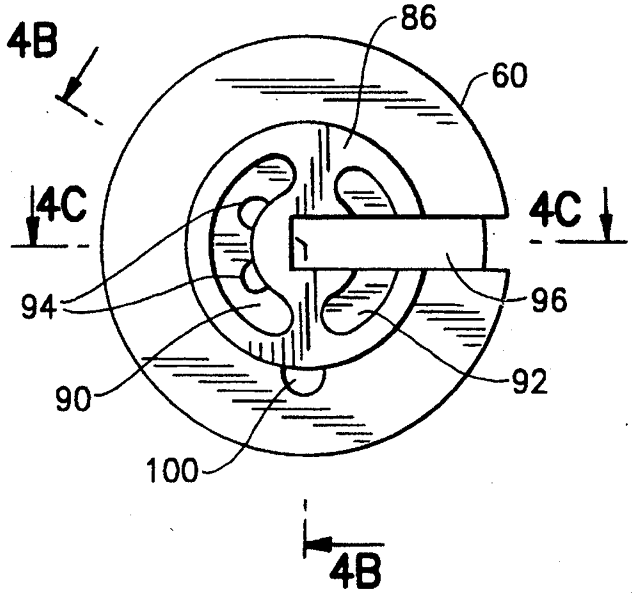
FIG. 4A is a plan rear view of the valve plate of the hydraulic drive system shown in FIG. 2.
Figure 4B:
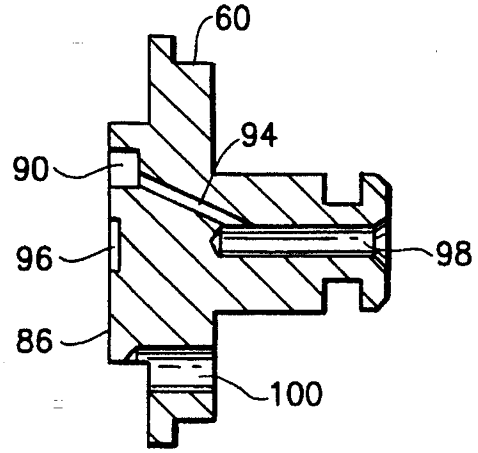
FIG. 4B is a cross-sectional view of the valve plate shown in FIG. 4A taken along line 4B—4B.
Figure 4C:
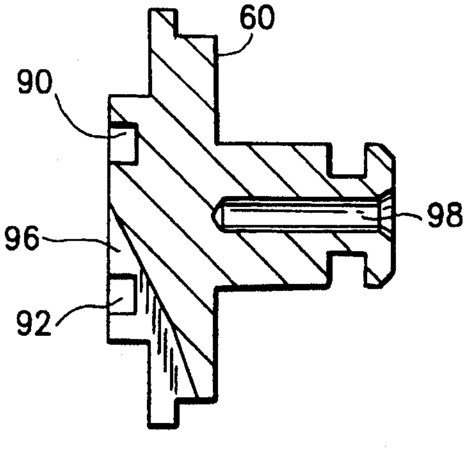
FIG. 4C is a cross-sectional view of the valve plate shown in FIG. 4A taken along line 4C—4C.

Referring also to FIGS. 4A–4C, the valve plate 60 generally comprises first and second grooves 90, 92 on the rear face 86, two discharge channels 94, an inlet channel 96, a front end discharge channel 98, and a locating pin hole 100. The two grooves 90, 92 are generally arc shaped and separate from each other. The two discharge channels 94 extend from the bottom of the first groove 90 to the front end discharge channel 98. The inlet channel 96 extends from a lateral side of the valve plate 60 into the second groove 92. As seen in FIG. 2, a pin 102 is located in the hole 100 to connect the valve plate 60 to the valve frame 42. The pin 102 prevents the valve plate 60 from axially rotating relative to the valve frame 42. A spring 104 is located between the valve plate 60 and the valve frame 42. The spring 104 biases rear face 86 of the valve plate 60 against the front face 84 of the conduit frame 44.

The operation of the tool 10 will now be described with reference to all the figures. When the user depresses the actuation trigger 34, the electric motor 26 is energized to axially rotate the conduit frame 44. As the conduit frame 44 is axially rotated, the piston members 46 reciprocally move in inward and outward directions in the conduits 80. Fluid from the reservoir 30 is able to enter the conduits 80 by passing through inlet channel 96 of the valve plate 60, through the second groove 92 and into the bores 82 of the conduit frame 44 when the bores 82 are in registry with the second groove 92. When the bores 82 are in registry with the second groove 92, correspondingly registered piston members 46 are being moved outwardly in the channels 80 to thereby suck or draw fluid into the channels 80. When the bores 82 move out of registry with the second groove 92 and into registry with the first groove 90, a fluid flow path is established out of the channels 80, through their bores 82, into the first groove 90, through the discharge channels 94, 98 and to the main check valve 56. More specifically, the channels 80 and bores 82 that are in registry with the first groove 90 have their piston members 46 pushed in an inward direction on the conduit frame 44 while in such registry. Thus, the piston members 46 push the fluid out of the channels 80 and bores 82 into the first groove 90. The pumping action of the pump 24 is dependent upon the piston members 46 moving reciprocally in the channels 80. This reciprocal movement is dependent upon the axis of rotation of the conduit frame 44 being different from the center axis of the ring bearing 48. The greater the difference between the two axes, the greater the volume of fluid that can be pumped per revolution of the conduit frame 44.

The ring bearing 48 is movable in the area 64 between the position shown in FIG. 3A and the position shown in FIG. 3B. This movement has been intentionally allowed to allow the distance between the two axes to be changed. More specifically, the center axis of the ring bearing 48 is adapted to automatically move closer to the center axis of the conduit frame 44 when pressure in the hydraulic system increases. As an item is being compressed between the ram 20 and frame 22, the hydraulic system pressure increases. This increase in pressure is, of course, felt at the piston members 46 that move the fluid. The increased force applied against the piston members 46 during their inward pumping stroke is transmitted by the piston members 46 to the ring bearing 48. When the hydraulic system pressure increases to a predetermined level, the ring bearing 48 is moved in direction A with the springs 72 of the adjusting locations 50 being compressed. As the center axis of the ring bearing 48 moves closer to the center axis of the conduit frame 44, the pump 24 pumps a lesser amount of fluid. This is because the stroke of the piston members 46 in the conduits 80 becomes shorter. Since less fluid is being pumped per revolution of the conduit frame 44, less power is required for the motor 26 to rotate the conduit frame 44 than would otherwise be necessary if the axes were not moved closer. Limit screw 76 can be adjusted so that the ring bearing 48 is not able to obtain a coaxial position with the conduit frame 44. Thus, the pump 24 will always pump fluid when actuated even at very high pressure levels. Because the pump 24 is able to automatically adjust its volume of pumping based upon hydraulic system pressure, no significant load increase is transmitted to the electric motor 26. Thus, the motor 26 is able to operate at a relatively constant speed regardless of the hydraulic system pressure. This has a significant advantage for the battery powered tool 10 because it prolongs the life of the battery 28. More specifically, because the motor 26 operates at a substantially constant speed, the power drain on the battery is substantially uniform. A uniform power drain on a battery allows the battery to last longer between recharges and, have a longer working life before having to be replaced. When the user stops depressing the trigger 34, the motor 26 stops and the locators 50 push the ring bearing 48 in direction B back to its starting position shown in FIG. 3A. Relieve valve 58 automatically prevents the hydraulic system pressure from exceeding a predetermined value. Release value 40 allows the user to manually release fluid from behind the ram in order to retract the ram 20. Relief valves and release valves are well known in the art.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In a portable compression tool having a working head, an electric motor, and a hydraulic drive system operably connecting the electric motor to the working head, the improvement comprising:

the hydraulic drive system having a self-regulating variable displacement pump with means for allowing the electric motor to operate at a substantially constant speed regardless of an increase in hydraulic pressure in the hydraulic drive system.

2. A tool as in claim 1 wherein the pump is directly mechanically connected to a drive shaft of the electric motor.

3. A tool as in claim 2 wherein the drive shaft of the motor is directly connected to a rotatable conduit frame of the pump.

4. A tool as in claim 1 wherein the pump has a rotatable conduit frame with radial conduits and piston members movably located in the radial conduits.

5. A tool as in claim 4 wherein the piston members are rotatable with the conduit frame and are reciprocally moved in the radial conduits as the conduit frame is rotated to thereby pump hydraulic fluid through the radial conduits.

6. A tool as in claim 5 wherein the pump includes a ring bearing that surrounds the rotatable conduit frame and has ends of the piston members thereagainst.

7. A tool as in claim 6 wherein the ring bearing is adjustably movable through eccentric positions relative to the rotatable conduit frame.

8. A tool as in claim 4 wherein the pump further comprises a valving plate located against an end of the rotatable conduit frame, the valving plate having a first groove on a first end adjacent the rotatable conduit frame and a discharge channel from the first groove through the valving plate.

9. A tool as in claim 8 wherein the valving plate has a second groove on its first end separate from the first groove and, an inlet channel from a lateral side of the valving plate to the second groove.

10. A tool as in claim 7 wherein a spring biases the ring bearing towards an eccentric position.

11. In a hydraulic tool having a working head, an electric motor, and a hydraulic drive system, the improvement comprising:

the hydraulic drive system having a pump with a rotatable conduit frame directly connected to a drive shaft of the electric motor and a plurality of piston members movably located in radial conduits of the conduit frame, wherein the piston members are rotated with the conduit frame and are reciprocally moved in the radial conduits as the conduit frame is rotated to thereby pump hydraulic fluid through the conduit frame.

12. A tool as in claim 11 wherein the pump includes a ring bearing surrounding the rotatable conduit frame and having ends of the piston members thereagainst.

13. A tool as in claim 12 wherein the ring bearing is adjustably movable relative to the rotatable conduit frame in a plane orthogonal to an axis of rotation of the rotatable conduit frame.

14. A tool as in claim 13 wherein the ring bearing is biased by a spring towards an eccentric position relative to the rotatable conduit frame.

15. A tool as in claim 11 wherein the rotatable conduit frame has separate bores from the radial conduits to a front face of the conduit frame.

16. A tool as in claim 15 wherein the hydraulic drive system has a valve member located against the front face of the conduit frame.

17. A tool as in claim 16 wherein the valve plate has separate first and second arc shaped grooves on a first end of the valve member adjacent the front face of the conduit frame, a discharge channel from the first groove to a second end of the valve member, and an inlet channel from a lateral side of the valve member to the second groove.

18. In a portable compression tool having a working head, an electric motor, a battery, and a hydraulic drive system, the improvement comprising:

the hydraulic drive system having a rotatable piston ring, a plurality of piston members located adjacent to an interior side of the piston ring and projecting towards each other, and a rotatable conduit frame connected to the motor and located inside the piston ring, the conduit frame having a plurality of inwardly extending radial piston conduits, the piston ring and the conduit frame being located in parallel non-concentric axes of rotation such that rotation of the conduit frame causes the pistons to reciprocally move in the piston conduits.

* * * * *